United States Patent [19]
Dexter et al.

[11] 3,758,549
[45] Sept. 11, 1973

[54] POLY ALKANOL ESTERS OF ALKYLTHIO-ALKANOIC ACIDS

[75] Inventors: Martin Dexter, Briarcliff Manor; David Steinberg, Bronx, both of N.Y.

[73] Assignee: Ciba-Geigy Corporation, Ardsley, N.Y.

[22] Filed: Oct. 12, 1971

[21] Appl. No.: 188,436

[52] U.S. Cl. .................. 260/481 R, 44/70, 99/163, 252/407, 260/45.85, 260/398.5
[51] Int. Cl. ............................... C07c 149/20
[58] Field of Search ................................. 260/481 R

[56] References Cited
UNITED STATES PATENTS
2,601,063   6/1952   Smith et al. ..................... 260/481 R FOREIGN PATENTS OR APPLICATIONS
2,028,240   12/1970   Germany ........................ 260/481 R OTHER PUBLICATIONS
Nagakubo et al. C.A. 57 13981f

*Primary Examiner*—Lorraine A. Weinberger
*Assistant Examiner*—John F. Terapane
*Attorney*—Karl F. Jorda and Nestor W. Shust

[57] ABSTRACT

Alkyl esters derived from alkylthioalkanoic acids and alkane polyols are stabilizers of organic material normally subject to thermal and oxidative deterioration. They are prepared by conventional esterification techniques. Typical embodiments are pentearythritol tetrakis (3-n-dodecylthiopropionate) and ethylene bis (3-n-didecylthiopropionate). The esters are used in conjunction with phenolic antioxidants to effectively stabilize organic materials from the deliterious effects of heat and oxygen.

3 Claims, No Drawings

POLY ALKANOL ESTERS OF ALKYLTHIO-ALKANOIC ACIDS

The present invention pertains to alkyl esters of alkylthioalkanoic acids and to compositions which are stabilized by these esters and to various novel uses of these esters.

In particular, this invention pertains to compounds of the formula:

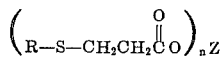   I wherein
R is an alkyl group of from one to 18 carbon atoms,
n has a value of from 2 to 4; and
z is an aliphatic hydrocarbon of the formula;
$C_yH_{2y+2-n}$
in which y has a value of from 2 to 18 when n is 2 and a value of from 3 to 6 when n is greater than 2, the value of y in all cases being equal to or greater than that of n.

Illustrative examples of the alkyl groups of from one to 18 carbon atoms which are represented by R are methyl, ethyl, propyl, pentyl, heptyl, decyl, dodecyl, octadecyl and the like. Alkyl groups of higher molecular weight can also be used such as those containing up to about 30 carbon atoms. R groups containing from 12 to 18 carbon atoms are most preferred. Embraced within these groups are both the straight and branched chain alkyl groups.

The alkylthioalkanoic acids esters of alkane polyols of the present invention have as their characteristic property the ability to vastly improve the effect of numerous other compounds which are used as stabilizers for organic material normally subject to thermal and oxidative deterioration. Thus while the compounds of the present invention may be considered as stabilizers in their own right, their properties are such that they would be more conventionally classified as "synergists" in that when combined with known stabilizers, they exhibit the ability to increase stabilization to a degree for exceeding that which would be expected from the additive properties of the individual components.

Organic materials which, being normally subject to deterioration, are often stabilized by the addition of various stabilizing compounds and which therefore are suitable for the further addition of compounds of the present invention include for example synthetic organic polymeric substances such as vinyl resins formed by the polymerization of vinyl halides or from the copolymerization of vinyl halides with unsaturated polymerizable compounds, e.g. vinyl ester, α,β-unsaturated esters, α,β-unsaturated acids, α,β-unsaturated ketones or aldehydes and unsaturated hydrocarbons such as butadiene and styrene; poly-α-olefins such as polypropylene, polyethylene, polybutylene, polyisoprene and the like, including copolymers of α-olefins; polyurethanes such as are prepared from polyols and organic polyisocyanates; polyamides such as poly(hexamethylene adipamide); polyesters such as poly(methylene terephthalates); polycarbonates; polyacetals; polystyrene; poly(ethylene oxide); copolymers such as those found by the copolymerization of acrylonitrile, butadiene and/or styrene; as well as physical mixtures of the above such as high impact polystyrene containing copolymers of butadiene and styrene; urea-formaldehyde-alkyd finishes and the like.

Other materials so stabilized include lubricating oils such as those of the aliphatic ester type e.g., di-hexyl azelate, di-(2-ethylhexyl)azelate, di-(3,5,5,-tri-methylhexyl)glutarate, di(3,5,5-trimethylpentyl)-glutarate, di-(2)ethylhexyl)pimelate, di-(2-ethylhexyl)-adipate, diisoamyl adipate, triamyl tricarballate, pentaerythritol tetracaproate, dipropylene glycol dipelargonate, 1,5-pentanediol di-(2-ethylhexanoate), and the like; fats and oils of animal and vegatable origin e.g. linseed oil, menhaden oil, cod liver oil, castor oil, olive oil, rapeseed oil, coconut oil, palm oil, corn oil, sesame oil, peanut oil, cotton seed oil, butter, fat, lard, beef tallow and the like; saturated and unsaturated hydrocarbons such as for example, both natural and synthetic gasolines, jet fuels, diesel oils, mineral oils, fuel oils, drying oils, waxes and resins.

The compounds of this invention exhibit their novel properties when combined with a wide variety of stabilizers some of which are commercially available and some of which are the subject of Patents.

Typical of the phenolic antioxidants whose stabilizing properties are improved by the addition of compounds of the present invention, are the following:

1. Phenolic compounds having the general formula
Q—(CH$_2$)$_w$—A
wherein
Q is

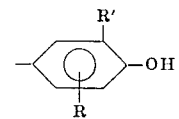

A is (CR(COOR'')$_2$

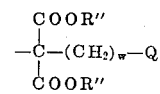

R is hydrogen or lower alkyl
R' is lower alkyl
R'' is alkyl group having from six to 24 carbon atoms
w is an integer from 1 to 4.

Illustrative examples of the compounds shown above are

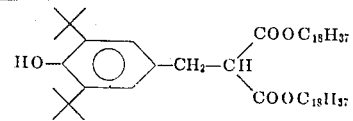

di-n-octadecyl(3-t-butyl-4-hydroxy-5-methylbenzyl)-malonate di-n-octadecyl α(3-t-butyl-4-hydroxy-5-methylbenzyl)malonate which is disclosed in the Netherlands Patent No. 6,711,199 di-n-octadecyl-α,α'-bis-(3-t-butyl-4-hydroxy-5-methylbenzyl)malonate which is disclosed in the Netherland Patent No. 6,803,498

2. Phenolic compounds having the general formula
Q—R
Illustrative examples of the compounds shown above are 2,6-di-t-butylphenol
2,4,6-tri-t-butylphenol
2,6-dimethylphenol
2-methyl-4,6-di-t-butylphenol
3. Phenolic compounds having the formula
A—$C_wH_{2w}$—Q
2,2'-methylene-bis(6-t-butyl-4-methylphenol)
2,2'-methylene-bis(6-butyl-4-ethylphenol)
4,4'-butylidene-bis(2,6-di-t-butylphenol)
4,4'-(2-butylidene)-bis(2-t-butyl-5-methylphenol)
2,2'-methylene-bis[6-(1-methylcyclohexyl)-4-methylphenol]
and the like.
4. Phenolic compounds having the formula
R—O—Q
Illustrative examples of such compounds are
2,5-di-t-butylhydroquinone
2,6-di-t-butylhydroquinone
2,5-di-t-butyl-4-hydroxyanisole
5. Phenolic compounds having the formula
Q—S—Q
Illustrative examples of such compounds are
4,4'-thiobis-(2-t-butyl-5-methylphenol)
4,4'-thiobis-(2-t-butyl-6-methylphenol)
2,2'-thiobis-(6-butyl-4-methylphenol)
6. Phenolic compounds having the formula

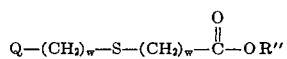

Illustrative examples of such compounds are
octadecyl-(3,5-dimethyl-4-hydroxybenzylthio)acetate
dodecyl-(3,5-di-t-butyl-4-hydroxybenzylthio)propionate
7. Phenolic compounds having the formula

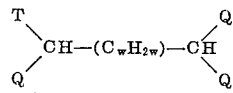

wherein T is hydrogen
R or Q as defined above.
Illustrative examples of such compounds are
1,1,3-tris(3,5-dimethyl-4-hydroxyphenyl)-propane
1,1,3-tris(5-t-butyl-4-hydroxy-2-methylphenyl)butane
1,1,5,5-tetrakis-(3'-t-butyl-4'-hydroxy-6'-methylphenyl)-n-pentane
8. Phenolic compounds having the formula

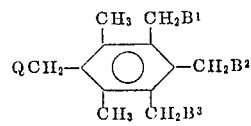

wherein $B^1$, $B^2$ and $B^3$ are hydrogen or Q, provided that when $B^1$ and $B^3$ are Q then $B^2$ is hydrogen and when $B^3$ is Q then $B^1$ and $B^2$ are hydrogen.
Illustrative examples of such compounds are
1,4-di(3,5-di-t-butyl-4-hydroxybenzyl)-2,3,5,6-tetramethylbenzene
1,3,5-tri(3,5-di-t-butyl-4-hydroxybenzyl)-2,4,6-trimethylbenzene
9. Phenolic compounds having the formula

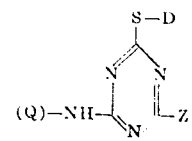

wherein
Z is NHQ, —S—D or —O—Q
D is alkyl group having from six to 12 carbon atoms
or —($C_wH_{2w}$)—S—R''
Illustrative examples of such compounds are
2,4-bis(n-octylthio)-6-(3,5-di-t-butyl-4-hydroxyanilino)-1,3,5-triazine
6-(4-hydroxy-3-methyl-5-t-butylanilino-2,4-bis-(n-octylthio)-1,3,5-triazine
6-(hydroxy-3,5-dimethylanilino)-2,4-bis-(n-octylthio)-1,3,5-triazine
6-(4-hydroxy-3,5-di-t-butylanilino)-2,4-bis-(n-octylthioethylthio)-1,3,5-triazine
6-(4-hydroxy-3,5-di-t-butylanilino)-4-(4-hydroxy-3,5-di-t-butylphenoxy)-2-(n-octylthio)-1,3,5-triazine
2,4-bis(4-hydroxy-3,5-di-t-butylanilino)-6-(n-octylthio)-1,3,5-triazine.
The above phenolic triazine stabilizers are more fully described in U.S. Pat. No. 3,255,191.
10. Phenolic compounds having the formula

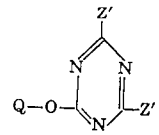

wherein Z' is —O—Q, —S—D or —S—($C_wH_{2w}$)—SD
Illustrative examples of such compounds are
2,4-bis-(3,5-di-t-butyl-4-hydroxyphenoxy)-6-(n-octylthio)-1,3,5-triazine
2,4,6-tris-(4-hydroxy-3,5-di-t-butylphenoxy)-1,3,5-triazine
6-(4-hydroxy-3,5-di-t-butylphenoxy)-2,4-bis-(n-octylthioethylthio)-1,3,5-triazine
6-(4-hydroxy-3-methylphenoxy)-2,4-bis-(n-octylthio)-1,3,5-triazine
6-(4-hydroxy-3-t-buylphenoxy)-2,4-bis-(n-octylthioethylthio)-1,3,5-triazine
6-(4-hydroxy-3-methyl-5-t-butylphenoxy)-2,4-bis-(n-octylthio)-1,3,5-triazine
2,4-bis-(4-hydroxy-3-methyl-5-t-butylphenoxy)-6-(n-octylthio)-1,3,5-triazine
2,4,6-tris-(4-hydroxy-3-methyl-5-t-butylphenoxy)-1,3,5-triazine
6-(4-hydroxy-3,5-di-t-butylphenoxy)-2,4-bis-(n-octylthiopropylthio)-1,3,5-triazine
6-(4-hydroxy-3,5-di-t-butylphenoxy)-2,4-bis-(n-dodecylthioethylthio)-1,3,5-triazine
2,4-bis-(4-hydroxy-3,5-di-t-butylphenoxy)-6-butylthio-1,3,5-triazine
2,4-bis-(4-hydroxy-3,5-di-t-butylphenoxy)-6-(n-octadecylthio)-1,3,5-triazine
2,4-bis-(4-hydroxy-3,5-di-t-butylphenoxy)-6-(n-dodecylthio)-1,3,5-triazine
2,4-bis-(4-hydroxy-3,5-di-t-butylphenoxy)-6-(n-octylthiopropylthio)-1,3,5-triazine
2,4-bis-(4-hydroxy-3,5-di-t-butylphenoxy)-6-(n-octylthioethylthio)-1,3,5-triazine 2,4-bis-(4-hydroxy-3,5-di-t-butylphenoxy)-6-(n-dodecylthioethylthio)-1,3,5-triazine.

The above phenolic triazine stabilizers are more fully described in U.S. Pat. No. 3,255,191.

11. Phenolic compounds having the formula

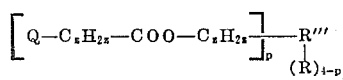

wherein p is an integer from 1 to 4 and

R''' is a tetravalent radical selected from aliphatic hydrocarbons having from one to 30 carbon atoms aliphatic mono and dithioethers having from one to 30 carbon atoms aliphatic mono and diethers having from one to 30 carbon atoms.

z has a value of from 0 to 6.

Illustrative examples of such compounds are

Sub-class I n-Octadecyl 3-(3,5-di-t-butyl-4-hydroxyphenyl)propionate
n-Octadecyl 3,5-di-t-butyl-4-hydroxyphenylacetate
n-Octadecyl 3,15-di-t-butyl-4-hydroxybenzoate
n-Hexyl 3,5-di-t-butyl-4-hydroxybenzoate
n-Dodecyl 3,5-di-t-butyl-4-hydroxybenzoate
Neo-dodecyl 3-(3,5-di-t-butyl-4-hydroxyphenyl)propionate
Dodecyl 2-(3,5-di-t-butyl-4-hydroxyphenyl)propionate
Ethyl α-(4-hydroxy-3,5-di-t-butylphenyl)-isobutyrate
Octadecyl α-(4-hydroxy-3,5-di-t-butylphenyl)-isobutyrate
Octadecyl α-(4-hydroxy-3,5-di-t-butylphenyl)-propionate

Sub-class II 2-(n-octylthio)ethyl 3,5-di-t-butyl-4-hydroxybenzoate
2-(n-octylthio)ethyl 3,5-di-t-butyl-4-hydroxyphenylacetate
2-(n-octadecylthio)ethyl 3,5-di-t-butyl-4-hydroxyphenylacetate
2-(n-octadecylthio)ethyl 3,5-di-t-butyl-4-hydroxybenzoate
2-(2-hydroxyethylthio)ethyl 3,5-di-t-butyl-4-hydroxybenzoate
2,2'-Thiodiethanol bis(3,5-di-t-butyl-4-hydroxyphenyl)acetate
Diethyl glycol bis-[3,5-di-t-butyl-4-hydroxyphenyl)propionate]
2-(n-octadecylthio)ethyl 3-(3,5-di-t-butyl-4-hydroxyphenyl)propionate
2,2'-Thiodiethanol-bis-3-(3,5-di-t-butyl-4-hydroxyphenyl)propionate
Stearamido N,N-bis-[ethylene 3-(3,5-di-t-butyl-4-hydroxyphenyl)propionate]
n-Butylimino N,N-bis-[ethylene 3-(3,5-di-t-butyl-4-hydroxyphenyl)propionate]
2-(2-stearoyloxyethylthio)ethyl 3,5-di-t-butyl-4-hydroxybenzoate
2-(2-hydroxyethylthio)ethyl 7-(3-methyl-5-t-butyl-4-hydroxyphenyl)heptanoate
2-(2-stearoyloxyethylthio)ethyl 7-(3-methyl-5-t-butyl-4-hydroxyphenyl)heptanoate

Sub-class III 1,2-propylene glycol bis-[3-(3,5-di-t-butyl-4-hydroxyphenyl)propionate]
Ethylene glycol bis-[3-(3,5-di-t-butyl-4-hydroxyphenyl)propionate]
Neopentylglycol bis-[3-(3,5-di-t-butyl-4-hydroxyphenyl)propionate]
Ethylene glycol bis-(3,5-di-t-butyl-4-hydroxyphenylacetate)
Glycerine-1-n-octadecanoate-2,3-bis-(3,5-di-t-butyl-4-hydroxyphenylacetate
Pentaerythritol tetrakis [3-(3,5-di-t-butyl-4-hydroxyphenyl)propionate]
1,1,1-trimethylol-tris-3-(3,5-di-t-butyl-4-hydroxyphenyl)propionate
Sorbitol hexa-[3-(3,5-di-t-butyl-4-hydroxyphenyl)propionate]
1,2,3-butanetriol tris-[3-(3,5-di-t-butyl-4-hydroxyphenyl)propionate]
2-hydroxyethyl 7-(3-methyl-5-t-butyl-4-hydroxyphenyl)heptanoate
2-stearoyloxyethyl 7-(3-methyl-5-t-butyl-4-hydroxyphenyl)heptanoate
1,6-n-hexanediol-bis[(3',5'-di-t-butyl-4-hydroxyphenyl)propionate]

The above phenolic ester stabilizers of sub-classes I, II and III are more fully described in U.S. Pat. No. 3,330,859, Ser. No. 354,464, filed Mar. 24, 1964 and Ser. No. 359,460, filed Apr. 13, 1964, respectively.

12. Phenolic compounds having the formula

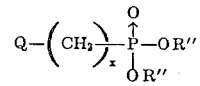

Illustrative examples of such compounds are

Dioctadecyl 3,5-di-t-butyl-4-hydroxybenzylphosphonate
Di-n-octadecyl 3-t-butyl-4-hydroxy-5-methylbenzylphosphonate
Di-n-octadecyl 1-(3,5-di-t-butyl-4-hydroxyphenyl)-ethanephosphonate
Di-n-tetradecyl 3,5-di-t-butyl-4-hydroxybenzylphosphonate
Di-n-hexadecyl 3,5-di-t-butyl-4-hydroxybenzylphosphonate
Didocosyl-3,5-di-t-butyl-4-hydroxybenzylphosphonate
Di-n-octadecyl 3,5-di-t-butyl-4-hydroxybenzylphosphonate The above di-(higher)alkyl phenolic phosphonates are more fully described in U.S. Pat. No. 3,281,505.

The above phenolic hydrocarbon stabilizers are known and many are commercially available.

In addition to one or more of the above phenolic stabilizers, it is often advantageous to employ other additives such as ultraviolet light absorbers, e.g., 2-hydroxy-4-methoxybenzophenone, 3-(2'-hydroxy-5'-methylphenyl)benzotriazole, etc.; various phosphite compounds such as trioctylphosphite, dilaurylphosphite, tris(nonylphenyl)phosphite and the like. Such two, three or four component systems, when including a compound of the present inventin, exhibit far superior properties to the additive properties of the individual components.

Other materials often added to such organic materials, depending upon the substrate, include pour-point depressants, corrosion and rust inhibitors, metal deactivators, demulsifiers, antifoam agents, carbon black, accelerators, plasticizers, color stabilizers, heat stabilizers, dyes, pigments and the like.

The alkyl alkylthioalkanoic acid esters of the present invention are preferably used in a concentration of from 0.005 percent to about 10 percent by weight of the total composition together with one or more of the above phenolic antioxidants, one or more ultraviolet light absorbers and/or one or more of the above phosphite compounds. These are particularly useful in synthetic organic polymeric substances such as polypropylene, polyethylene, polystyrene and the like to protect such substances from deterioration both during use and during processing such as milling polypropylene or blow molding polyethylene. The compounds of the present invention exhibit superior compatability in diverse substances with little or no odor formation.

They are particularly useful in organic polymeric fibers because of their extraction resistance and low volatility.

These compounds may be incorporated or blended into polymeric compositions by the conventional methods utilized for blending such materials into resins and plastics. Typical of such methods that can be suitably employed include milling on heated rolls, deposition from solvents, and dry blending.

The compounds of formula 1 may be prepared by reacting an alkyl mercaptan of the formula

R—S—H  II wherein R is as defined previously, with methyl acrylate as described by Stevens et al, J. Am. Chem. Soc. 73, Vol. 50 (1951). The monoester thus obtained is reacted with a alkane polyol of the formula $(HO)_n$—Z  III wherein Z is as defined previously, via a standard transesterification reaction. The transesterification reaction involves a treatment of the polyol with up to a 15 percent excess, preferably from 5 to 10 percent excess, over stoicheometric amount of the ester. This reaction is catalyzed with a hydride or lower alkoxide of an alkaline metal such as lithium hydride, lithium methoxide or sodium methoxide. These catalysts are employed in an amount from about 0.01 to about 0.30 mole equivalents per mole of polyol. The reaction is conducted at elevated temperatures and under reduced pressure, the lower alkanol which is formed being removed by distilation.

The alkane polyols of formula 3 are well known and most are commercially available. The polyols will thus consist of the straight or branched-chain hydrocarbon residue of the formula $C_yH_{2y+2-n}$ and a number of hydroxy groups equal to $n$. When $n$ is two, i.e., the polyol is a diol, this hydrocarbon residue will have from two to 18 carbon atoms and preferably from three to nine carbon atoms. When $n$ is greater than two; i.e., the polyol is a triol, or tetrol, the hydrocarbon residue will have from three to seven carbon atoms. In all cases the number of hydroxy groups and the resulting number of alkylthioalkanoyloxy groups (as designated by $n$) will be equal to or less than the number of carbon atoms ($y$) in the hydrocarbon residue; i.e., since each carbon atom of the hydrocarbon residue can bear only one hydroxy group $y$ is equal to or greater than $n$.

The following examples, presented for illustration and not limitation, will further serve to typify the nature of the present invention. In these examples, parts are by weight unless otherwise indicated.

EXAMPLE 1

Methyl 3-n-dodecylthiopropionate

Methyl acrylate, 86.1 parts, was added to a cold mixture of n-dodecyl mercaptan, 123 parts, and sodium methylate, 0.5 parts, over a 50 minute interval. The temperature of the reaction was kept at 25°–30°C by means of an ice-bath. After all the reactants were combined, the reaction mixture was stirred at the ambient temperature for about 17 hours. After this time about 1 part of filtercel was added and the resulting slurry filtered through a sintered glass funnel. The product was purified by vacuum distillation. There was obtained 125.8 parts of the above-named product having boiling point 152°–153.5°C, 0.3–0.4 mm which gave the following analysis:

Analysis for $C_{16}H_{32}SO_2$

Calculated: C, 66.61; H, 11.18; S, 11.11.

Found: C, 66.86; H, 11.30; S, 10.92.

By essentially following the procedure of this example, but substituting for n-dodecyl mercaptan an equivalent amount of the following alkyl mercaptans:

a. ethylmercaptan
b. n-hexylmercaptan
c. n-octylmercaptan
d. n-decylmercaptan
e. n-octadecylmercaptan there is respectively obtained a. methyl 3-ethylthiopropionate
b. methyl 3-n-hexylthiopropionate
c. methyl 3-n-octylthiopropionate
d. methyl 3-n-decylthiopropionate
e. methyl 3-n-octadecylthiopropionate

EXAMPLE 2

Ethylene bis(3-n-dodecylthiopropionate)

a. A mixture consisting of 31.74 parts of methyl 3-n-dodecylthiopropionate and 3.10 parts of ethylene glycol was stirred and 0.14 parts of sodium methylate added. The reaction mixture was heated for about 6.5 hours at 100°±5°C in a nitrogen atmosphere. After cooling to room temperature, the reaction mixture was dissolved in 1:1 benzene-heptane and passed through a bed of alumina. After removing impurities in the early fractions, the pure product was obtained as a white solid having melting point 50°–2°.

Analysis for $C_{32}H_{62}S_2O_4$:

Calculated: C, 66.84 H, 10.86; S, 11.15

Found: C, 67.13; H, 10.66; S, 11.22 b. By essentially following the procedure of this example, but substituting for the reactants, i.e., ethylene glycol and methyl 3-n-dodecylthiopropionate an equivalent amount of the following reactants:

1. 1,2-propylene glycol + methyl 3-ethylthiopropionate
2. 1,4-butane diol + methyl 3-n-hexylthiopropionate
3. neopentyl glycol + methyl 3-n-octylthiopropionate
4. 1,5-pentanediol + methyl 3-n-decylthiopropionate
5. 1,6-hexandiol + methyl 3-n-octadecylthiopropionate 6. 1,12-dodecanediol + methyl 3-n-dodecylthiopropionate
7. 1,2-octadecane + methyl 3-n-dodecylthiopropionate there is respectively obtained 1. 1,2-propylene bis(3-ethylthiopropionate)
2. 1,4-butane diol bis(3-n-hexylthiopropionate)
3. neopentyl glycol bis(3-n-octylthiopropionate)
4. 1,5-pentanediol bis(3-n-decylthiopropionate)
5. 1,6-hexanediol bis(3-n-octadecylthiopropionate)
6. 1,12-dodecanediol bis(3-n-dodecylthiopropionate)
7. 1,2-octadecanediol bis(3-n-dodecylthiopropionate)

EXAMPLE 3

1,1,1-trimethylolethane tris(3-n-dodecylthiopropionate)

By employing the procedure of the previous example and substituting 1,1,1-trimethylolethane for ethylene glycol, there is obtained the above-named product as a white solid melting at 44°–46°C.

Analysis for $C_{50}H_{96}S_3O_6$:

Calculated: C, 67.51; H, 10.87; S, 10.81
Found: C, 67.71; H, 10.70; S, 10.82

In a similar manner, by substituting for 1,1,1-trimethylolethane, an equivalent amoung of the following triols:

a. 1,2,3-butanetriol
b. glycerine
c. 1,1,1-trimethylolbutane
d. 1,1,1-trimethylolpropane there is respectively obtained a. 1,2,3-butanetriol tris(3-n-dodecylthiopropionate)
b. glycerine tris(3-n-dodecylthiopropionate)
c. 1,1,1-trimethylolbutane tris(3-n-dodecylthiopropionate)
d. 1,1,1-trimethylolpropane tris(3-n-dodecylthiopropionate)

EXAMPLE 4

Pentaerythritol tetrakis(3-n-dodecylthiopropionate)

By employing the procedure of the previous example and substituting pentaerythritol for ethylene glycol, there is obtained the above named product as a white solid melting at 47°–9°.

Analysis for $C_{65}H_{124}S_4O_8$:

Calculated: C, 67.18; H, 10.75; S, 11.03
Found: C, 66.99; H, 10.55; S, 11.03

In a similar manner by substituting an equivalent amount of methyl-3-n-octadecylthiopropionate for methyl-3-n-dodecylthiopropionate there is obtained pentaerythritol tetrakis(3-n-octadecylthiopropionate).

EXAMPLE 5

Unstabilized polypropylene powder (Hercules Profax 6501) was thoroughly blended with 0.3 percent by weight of the various alkylthioesters of this invention and 0.1 percent by weight various phenolic antioxidants. The blended materials were then milled on a two-roll mill at 182°C for 10 minutes, after which time the stabilized polypropylene was sheeted from the mill and allowed to cool.

The milled polypropylene sheets were then cut into pieces and pressed for 7 minutes on an hydraulic press at 218°C on a hydraulic press at 500 psi and then transferred to a cold press at 500 psi. Samples of the resulting 25 mil sheet were tested for resistance to accelerated aging in a forced draft oven at 150°C. The results are set out in Table 1 below:

TABLE 1

| Additive(s) | Oven Aging at 150°C Hours to Failure |
|---|---|
| 0.3% pentaerythritol tetrakis(3-n-dodecylthiopropionate) + 0.1% pentaerythritol tetrakis [3-(3,5-di-t-butyl-4-hydroxyphenyl)propionate] | 3170 |
| 0.3% 1,1,1-trimethylolethane tris(3-n-dodecylthiopropionate) + 0.1% pentaerythritol tetrakis [3-(3,5-di-t-butyl-4-hydroxyphenyl)propionate] | 3200 |
| 0.3% pentaerythritol tetrakis (3-n-dodecylthiopropionate) +0.1% 1,1,3-tris(3-t-butyl-4-hydroxy-6-methyl)butane | 970 |
| 0.3% 1,1,1-trimethylolethane tris(3-n-dodecylthiopropionate) + 0.1% 1,1,3 -tris(3-t-butyl-4-hydroxy-6-methyl)butane | 1120 |
| 0.3% ethylene bis(3-n-dodecylthiopropionate) +0.1% 1,1,3-tris(3-t-butyl-4-hydroxy-6-methyl)butane | 660 |
| 0.1% 1,1,1-trimethylolethane tris(3-n-dodecylthiopropionate) +0.3% di-n-octyl (3,5-di-t-butyl-4-hydroxybenzyl) phosphonate | 850 |
| 0.3% pentaerythritol tetrakis [3-(3,5-di-t-butyl-4-hydroxyphenyl)propionate] | 1170 |
| 0.3% di-n-octyl-3,5-di-t-butyl-4-hydroxybenzyl phosphonate | 245 |
| 0.3% 1,1,3-tris (3-t-butyl-4-hydroxy-6-methyl)butane | 40 |
| Unstabilized polypropylene | 3 |

The above data clearly indicates the significant increase in the stabilization of polypropylene upon the addition of the alkyl esters of alkylthioalkanoic acids of the present invention.

EXAMPLE 6

A water-white, refined (U.S.P. grade) mineral oil (Esso PRIMOL D) is stabilized and tested under the following test conditions.

A sample of the mineral oil (10 g) containing 0.3 percent by weight of di-n-octadecyl 3,5-di-ti-butyl-4-hydroxybenzyl phosphonate and 0.1 percent of ethylene bis(n-dodecylthiopropionate) is placed in a Sligh type oxidation flask filled with oxygen at room termperature (25°C) and atmospheric pressure. Thereafter, the flask is sealed to form a system having a mercury manometer which measures the pressure changes as oxygen is absorbed by the sample of the flask. The sample is then heated at 150°C until the manometer registers a decrease of 300 mm HG pressure within the flasks with reference to the maximum pressure obtained at 150°C. Results of this test show the increase oxidation resistance for the sample containing the stabilizer.

EXAMPLE 7

High impact polystyrene resin containing elastomer (i.e, butadiene-styrene) is stabilized against loss of elongation properties by incorporation of 0.3 percent by weight of di-n-octadecyl(3-t-butyl-4-hydroxy-5-methylbenzylmalonate and 0.1 percent pentaerythritol tetrakis (3-n-dodecylthiopropionate). Under the test conditions described below, the stabilized resin retains a higher percentage of its original elongation properties, whereas the unstabilized resin retains less elongation properties. A substantial improvement in stability is also noted when only 0.05 percent of the stabilizer is employed.

The unstabilized resin is dissolved in chloroform and the stabilizer then added, after which the mixture is cast on a glass plate and the solvent evaporated to yield a uniform film which, upon drying, is removed and cut up, and then pressed for 7 minutes at a temperature of 163°C and a pressure of 2,000 pounds per square inch into a sheet of uniform thickness (25 mil). The sheets are then cut into strips approximately 4 × 0.5 inches. A portion of these strips is then measureed for length of elongation in the Instron Tensile (Instron Engineering Corporation, Quincy, Mass.). The remaining portion of the strips is aged in a forced draft oven for 6 weeks at 75°C and thereafter tested for elongation. The stabilized polystyrene resin has retained much better its elongation property than the unstabilized resin.

Similar results are obtained when an equivalent amount of the following stabilizer combinations are used in place of the above mentioned stabilizer combinations.

a. 0.1 percent by weight of 1,12-dodecanediol bis(3-n-dodecylthiopropionate + 0.3 percent of 4,4'-butylidene-bis(2,6-di-t-butylphenol)
b. 0.1 percent by weight of 1,2-octadecanediol bis(3-n-dodecylthiopropionate + 0.3 percent of 2,4-bis(n-octylthio)-6-(3,5-di-t-butyl-4-hydroxyaniline)-1,3,5-triazine
c. 0.1 percent by weight of 1,1,1-trimethylolpropane tris(3-n-dodecylthiopropionate) + 0.3 percent of 2,4-bis(3,5-di-t-butyl-hydroxyphenoxy-6-(n-octylthio)1,2,3-triazine

EXAMPLE 8

A quantity of SBR emulsion containing 100 g of rubber (500 ml of 20 percent SBR obtained from Texas U.S., Synpol 1500) previously stored under nitrogen, is placed in a beaker and stirred vigorously. The pH of the emulsion is adjusted to 10.5 with a 0.5N NaOH solution.

To the emulsion is added 50 ml of 25% NaCl solution. A 6% NaCl solution adjusted with hydrochloric acid to a pH 1.5 is added in a thin stream with vigorous stirring. When pH 6.5 is reached, the rubber begins to coagulate and the addition is slowed down in order to maintain uniform agitation. The addition of the acidic 6% NaCl solution is terminated when a pH 3.5 is reached. The coagulated crumb-rubber slurry at pH 3.5 is stirred for one-half hour.

The coagulated rubber is isolated by filtration through cheese cloth, and rinsed with distilled water. After three subsequent washings with fresh distilled water, the coagulated rubber is dried, first at 25 mm Hg and finally to constant weight under high vacuum (1 mm) at 40°–45°C.

The dried rubber (25 g) is heated under nitrogen at 125°C in a Brabender mixer and to this is added with mixing 1.25 g (0.5 percent of 1,3,5-tri(3,5-di-t-butyl-4-hydroxybenzyl)2,4,6-trimethylbenzene and 0.1 percent pentaerythritol tetrakis (3-n-octadecylthiopropionate). The composition is mixed for 5 minutes after which it is cooled and compression molded at 125°C into 5 inch × 5 inch × 0.025 inch plaques.

The plaques are placed on aluminum sheets and heated in a circulating air oven at 100°C for up to 96 hours. The viscosity of a 0.5 percent toluene solution of aged and unaged rubber samples are determined at 25°C. Stabilizer effectiveness is judged by the percent retention of specific viscosity, color formation and gel content after oven aging. The stabilized rubber has better viscosity, color retention, and less gel content than the rubber which is unstabilized after oven aging.

Similar results are obtained when n-octadecyl 3-(3,5-di-t-butyl-4-hydroxyphenyl)propionate and neopentyl glycol tris(3-n-octylthiopropionate) is used in place of the above mentioned stabilizers in the rubber composition.

EXAMPLE 9

A composition is prepared comprising linear polyethylene and 0.05 percent by weight of pentaerythritol tetrakis [3,(3,5-di-t-butyl-4-hydroxyphenyl)propionate] and 0.01 percent by weight of pentaerythritol tetrakis (3-n-dodecylthiopropionate). The composition is injected molded into tensile bars which are placed in a circulating air oven at 120°C. In contrast to those molded from unstabilized linear polyethylene, tensile bars molded from the instant composition retained its tensile strength for substantially longer period

EXAMPLE 10

Cyclohexene, freshly distilled is stabilized by the addition thereto of 0.05 percent by weight of 2,2'-methylene-bis(6-t-butyl-4-methylphenol) and 0.01 percent by weight of 1,6-hexanediol bis(3-n-octadecylthiopropionate). The effectiveness of this stabilizer in cyclohexene is tested by the ASTM D 525–55 oxidation test. The unstabilized cyclohexene fails in shorter time as compared to the stabilized cyclohexene.

EXAMPLE 11

A stabilized high temperature lubricating oil is prepared by incorporating 2 percent weight of 4,4'-thiobis(2-t-butyl-5-methylphenol and 0.5 percent by weight of 1,2-propylene bis(3-ethylthiopropionate) to the lubricant which comprises diisoamyladipate. The stabilized composition is compared with the unstabilized lubricant by heating at 175° in the present of air and metallic catalysts according to the test method described in Military Specification Mil–I–7808c. After 72 hours, the blank containing no stabilizer contains more sludge and has a greater viscosity than the stabilized lubricant.

What is claimed is:

1. A compound of the formula

wherein $n$ has a value of from 3 to 4; Z is an aliphatic hydrocarbon of the formula:

$C_yH_{2y+2-n}$ in which $y$ has a value of from 3 to 6, the value of $y$ being equal to or greater than the value of $n$; and R is an alkyl group of from 12 to 18 carbon atoms.

2. The compound of claim 1 which is 1,1,1-trimethylolethane bis(3-n-dodecylthiopropionate).

3. The compound of claim 1 which is pentaerythritol tetrakis(3-n-dodecylthiopropionate).